(No Model.) 2 Sheets—Sheet 1.
W. H. JONES & T. C. GREENE.
WIRE FENCE.
No. 536,955. Patented Apr. 2, 1895.
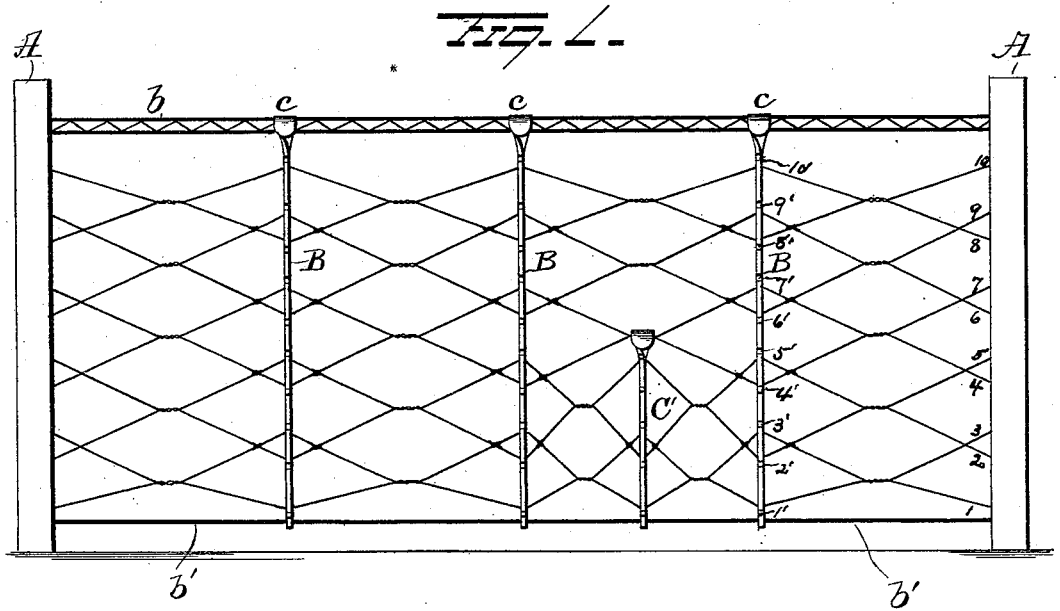
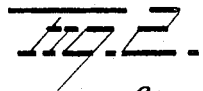
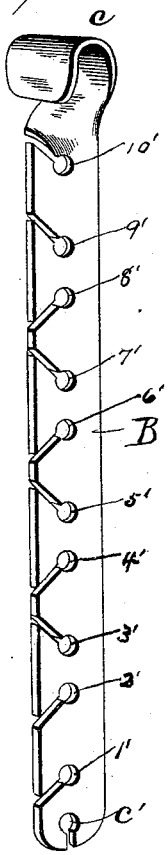
Witnesses
E. Nottingham
G. F. Downing
Inventors
W. H. Jones and
T. C. Greene
By H. A. Seymour
Attorney

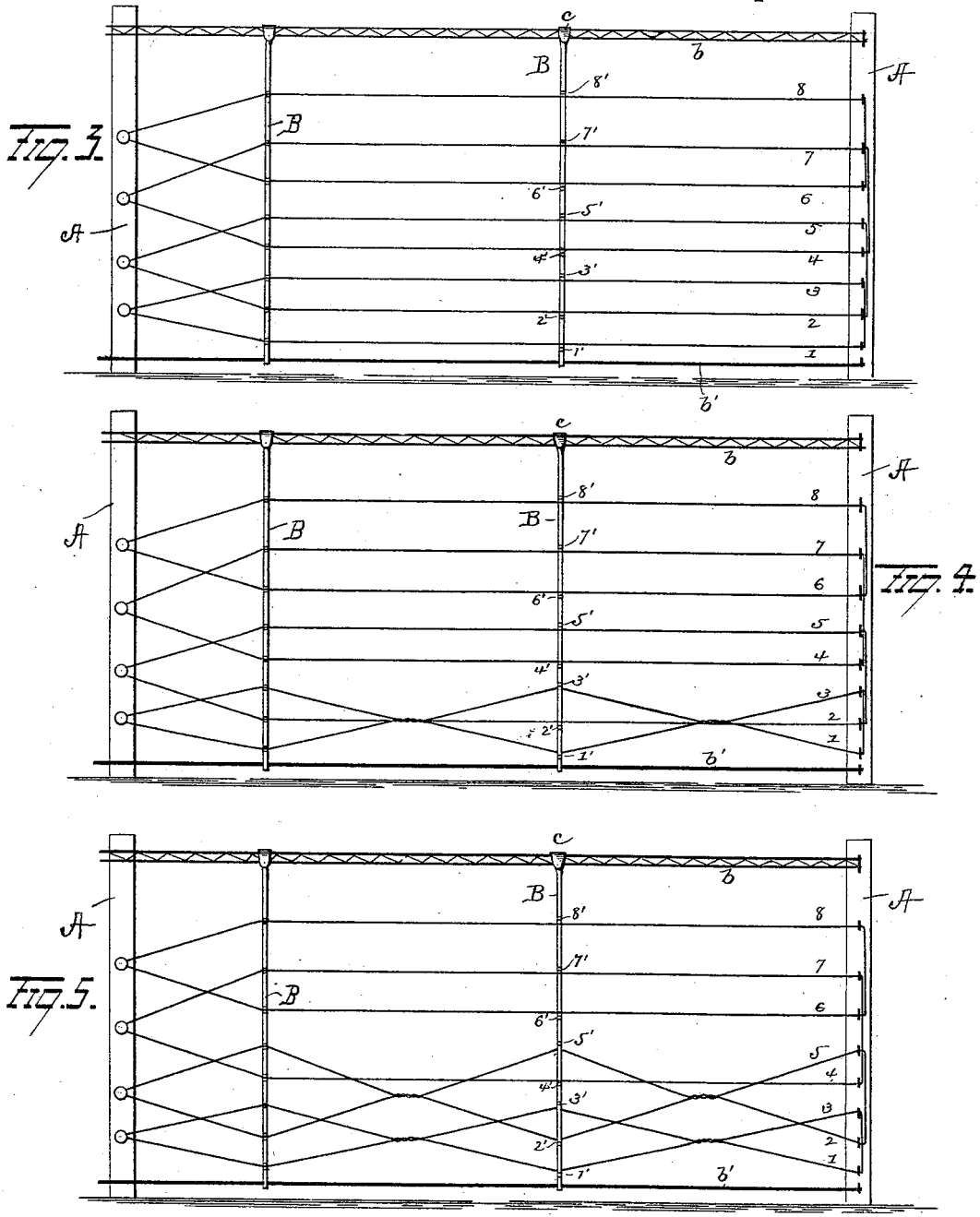

UNITED STATES PATENT OFFICE.

WILLIAM H. JONES AND THOMAS C. GREENE, OF LIBERTY, ASSIGNORS OF ONE-THIRD TO CHARLES F. CLEAVELAND, OF INDIANAPOLIS, INDIANA.

WIRE FENCE.

SPECIFICATION forming part of Letters Patent No. 536,955, dated April 2, 1895.

Application filed April 14, 1894. Serial No. 507,590. (No model.)

*To all whom it may concern:*

Be it known that we, WILLIAM H. JONES and THOMAS C. GREENE, residents of Liberty, in the county of Union and State of Indiana, have invented certain new and useful Improvements in Fences; and we do hereby declare the following to be a full, clear, and exact description of the invention, such as will enable others skilled in the art to which it appertains to make and use the same.

Our invention relates to an improvement in fences, the object being to provide an improved construction of wire fence which will be economical and at the same time effectual in confining and preventing the passage of stock.

A further object is to form a strong and substantial fence capable of having the slack taken up at any point, without difficulty and without changing or effecting the rest of the fence.

With these ends in view our invention consists in certain novel features of construction and combinations of parts, which will be hereinafter described and pointed out in the claims.

In the accompanying drawings: Figure 1 is a view of our improved fence. Fig. 2 is a view of one form of picket, and Figs. 3, 4 and 5 are views showing a section of the fence in different stages of completion, illustrating how the fence is made.

A, A, represent two posts placed at a suitable distance apart. To these posts the wires 1, 2, 3, 4, 5, 6, 7, and 8 are secured in the inverse order indicated in Fig. 4. These wires are twisted together at intervals and pickets B, B, are placed in position where they are required, to hold the wires in position, their distance apart being more or less dependent upon the distance apart of the posts. These pickets may be variously constructed and we have shown one form illustrated in Fig. 2 in which the upper end is given a quarter twist and bent over to form a hook $c$ whereby to receive and be suspended upon a top cable $b$. These pickets are straight strips of metal preferably with slots or notches 1', 2', 3', 4', 5', 6', 7', and 8', extending inwardly from one edge on an incline and enlarged at their inner ends. In the form shown the two end notches incline in the same direction whereas the intermediate ones incline alternately upward and downward. As shown in Fig. 2 the picket may have a notch $c'$ formed therein to receive the bottom cable $b'$.

In the formation of the fence the wires may be loosely stretched from one corner of a field to the next and fastened to posts. The wires are then held apart for example by a picket or its equivalent inserted at a suitable distance from one post. The wires are then twisted together in pairs and sprung in the notches in the pickets in the following manner: Wires 1 and 3 are taken at a point opposite picket B and given a twist. One of these wires preferably 1 is then sprung into notch 1' and the other into notch 3', two twists being formed, one at each side of the picket and about equal distances therefrom, or where they would naturally come. Wires 2 and 5 are next taken and twisted in the same manner, wire 2 being sprung into notch 2' and wire 5 into notch 5'. This form twists in these wires opposite and immediately above the twists in wires 1 and 3, and it crosses the wires 2 and 3 to form the small diamond shape between notches 2' and 3'. While the wires 2 and 3 are shown crossed merely at the ends of this diamond, it is obvious that they might be twisted to tighten the wires and frequently this is done. This twisting continues to the top. Then the wires are held apart again by another picket or equivalent device inserted at a suitable distance from the first two pickets and between this point and the second picket the wires are twisted as before and fastened to a third picket and so on, so that the twisting is only done and necessary at points opposite alternate pickets. This process continues until the fence is completed, there usually being from two to three pickets inserted between every two posts.

Sometimes it becomes necessary to tighten the lower wires or to break up and distribute the meshes of the lower portion of the fence. This is accomplished by the use of the short pickets C'. This is constructed preferably like the pickets B, B, only shorter and perhaps smaller and the wire in the center of the twists is spread to hook or spring into the notches. Then they are crossed and twisted if desired to form the small diamond as shown.

It is evident that slight changes might be made in the form and arrangement of the several parts described without departing from the spirit and scope of our invention and hence we do not wish to limit ourselves to the exact construction herein set forth, but Having fully described our invention, what we claim as new, and desire to secure by Letters Patent, is—

1. In a fence, the combination with a pair of wires twisted together at two separated points simultaneously and spread apart between these separated points, of a picket constructed to receive these wires at the spread point and to which both wires are detachably connected without requiring a change in the position of the picket, substantially as set forth.

2. In a fence, the combination with a pair of wires twisted together at two points simultaneously and spread apart between these points, of picket having notches in its edge into which notches the wires are sprung at the points where they are spread apart, substantially as set forth.

3. In a fence, the combination with two posts, and horizontal wires extending from one to the other, said wires twisted together in pairs and spread apart between the twists and one wire of each pair of wires crossed over or twisted to a wire of the next pair, and a picket constructed to retain the wires apart and taut between the intersecting points or twists, substantially as set forth.

4. In a fence, the combination with two posts, of a series of notched pickets, wires connected to these posts and pickets, and crossed or twisted together between the posts and pickets and between the pickets, and a short picket connected to the wires between two of the first mentioned pickets and the wires being crossed or twisted together in pairs between said short picket and the adjacent pickets, substantially as set forth.

5. In a fence, the combination with two posts, and a cable connected at its ends to said posts, of a series of notched pickets connected to said cable, wires connected to said posts and pickets and crossed or twisted together between the posts and pickets and between the pickets, and a short picket connected to said wires between two of the first mentioned pickets and at a point between the top and bottom of the fence, the wires being crossed or twisted together in pairs between said short picket and adjacent pickets, substantially as set forth.

6. The herein described method of constructing wire fence consisting in first stringing wires and holding them apart at two points, then twisting them together in pairs at two points simultaneously and spreading them apart between these twists, and finally hooking these wires at the spread point to a picket, constructed to receive them substantially as set forth.

7. In a fence, the combination with two posts, and longitudinal wires strung from one post to another, said wires twisted together and spread apart between the twists, pickets having notches therein for receiving the wires and holding them apart between the twists and longitudinal cables extending from one post to the next and connected with the upper and lower ends of the pickets, substantially as set forth.

In testimony whereof we have signed this specification in the presence of two subscribing witnesses.

W. H. JONES.
T. C. GREENE.

Witnesses:
J. A. DRIGGS,
J. E. CREED.